E. BERGVE AND O. JENSEN.
MANUFACTURE OF CONCENTRATED NITRIC ACID.
APPLICATION FILED SEPT. 30, 1918.
1,338,417.
Patented Apr. 27, 1920.
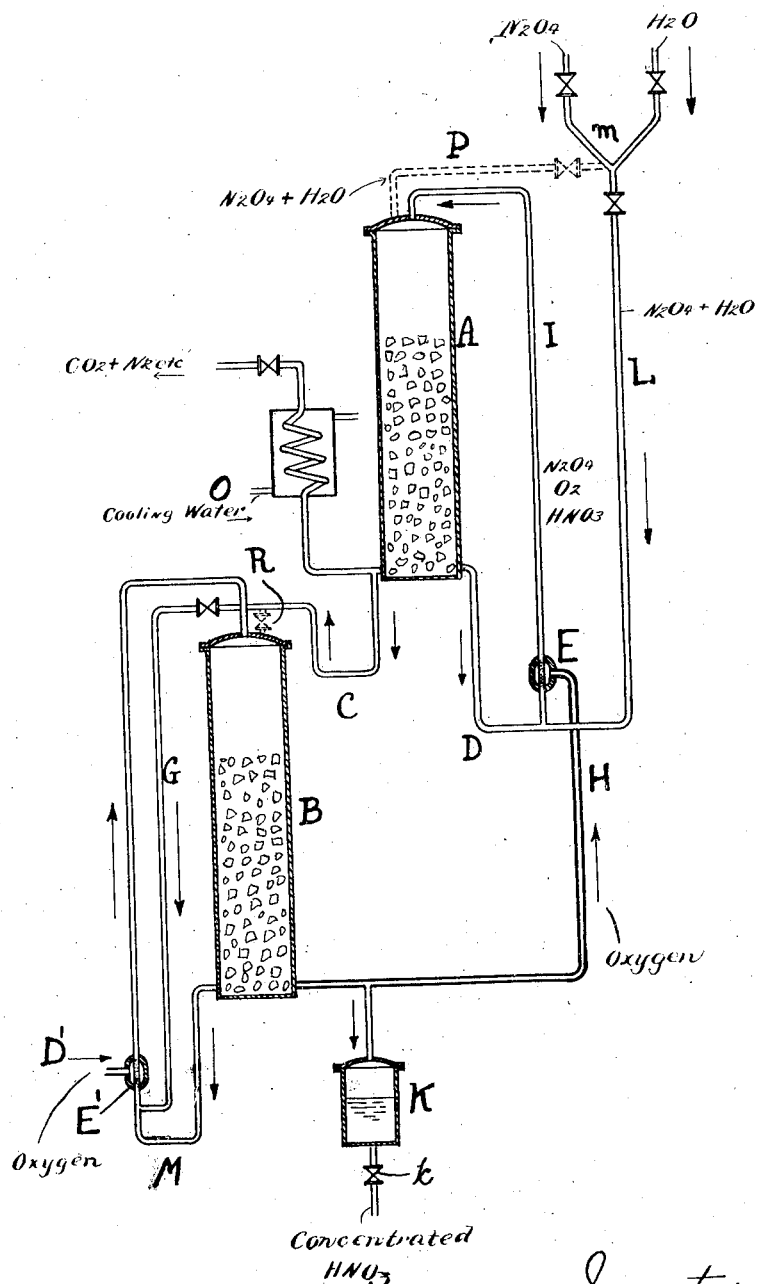

UNITED STATES PATENT OFFICE.

EINAR BERGVE, OF NOTODDEN, AND OLAF JENSEN, OF CHRISTIANIA, NORWAY, ASSIGNORS TO NORSK HYDRO-ELEKTRISK KVAELSTOFAKTIESELSKAB, OF CHRISTIANIA, NORWAY.

MANUFACTURE OF CONCENTRATED NITRIC ACID.

1,338,417. Specification of Letters Patent. Patented Apr. 27, 1920.

Application filed September 30, 1918. Serial No. 256,249.

*To all whom it may concern:*

Be it known that we, EINAR BERGVE and OLAF JENSEN, subjects of the King of Norway, of Notodden, Norway, and Christiania, Norway, respectively, have invented certain new and useful Improvements in the Manufacture of Concentrated Nitric Acid; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of concentrated nitric acid from nitrogen oxids and has for its object an improved process for carrying such manufacture into effect.

For the purpose of producing concentrated nitric acid from such nitrous gases as are obtained in processes of oxidizing nitrogen two methods have been tried. According to the one of these methods the gases have been absorbed in water so as to obtain dilute nitric acid, which thereupon by a concentration process has been converted into concentrated or highly concentrated nitric acid. This process can be carried out in a continuous manner but requires the use of a rather complicated apparatus. According to the second method, which has been suggested nitrogen peroxid is produced from the gases and is then (preferably in a liquid state) treated in an autoclave under a high pressure with an equimolecular quantity of water and oxygen the result aimed at thereby being to obtain highly concentrated nitric acid. The experiments which have been made to solve the problem in this manner have been based upon discontinuous processes.

This latter circumstance as well as the fact that the suggested processes which have been based upon this principle require a preceding conversion of the produced nitrogen oxids into nitrogen peroxid involving an unsatisfactory utilization of the oxygen have prevented the processes from coming into practical use.

According to the present invention, which is based upon a continuous working, highly concentrated nitric acid is obtained directly from gaseous nitrogen oxid and nitrogen tetroxid (peroxid) by means of subjecting these gases to the action of oxygen under pressure in a system of apparatus comprising two or more scrubbers in which the mixture of oxygen and the said gases come into contact with water or dilute nitric acid respectively. This method requires an apparatus of a comparatively simple construction and the oxygen necessary for the process is used to establish a circulation of the reaction liquid in the various sections of the apparatus. The oxygen is caused to remain as long as possible in contact with the liquid, the oxygen and liquid being moved in the same direction through the sections of the plant where the reaction takes place while the oxygen to obtain the best possible utilization of the same is moved in counter current to the liquid when the plant is considered as a unit.

A suitable method of carrying the invention into effect is described in the following, reference being had to the accompanying drawing.

In the illustrated example the process is carried out in two steps. Nitrogen tetroxid and water or dilute nitric acid are mixed in the Y-shaped pipe system m and the mixture flows through the pipe L down into a pneumatic liquid raiser E operated by oxygen introduced through the pipe H. The pneumatic liquid raiser causes the mixture to flow through the pipe I to the top of the tower A which is filled with pieces of quartz or other suitable material. From the bottom of the tower a portion of the liquid is returned through the pipe D to the raiser E, while another portion flows through the siphon C and pipe G to the pneumatic liquid raiser E', which is also operated by oxygen. This oxygen is supplied (from a compressor not shown) through the pipe D'. This raiser causes the mixture to pass to the top of the tower B. From the bottom of this tower a portion of the liquid is returned by the pipe M to the raiser E' while another portion is drawn off into the vessel K. The whole system is maintained under pressure, and to maintain the pressure the vessel K is provided with an outlet pipe closed by a valve k through which a quantity of acid may be periodically drawn off from the vessel K as a finished product ready for sale. It will be understood that the oxygen commences its circulation through the system in the liquid raiser E'. In raising the mixture of nitric acid and nitrogen tetroxid, the oxygen causes the formation of nitric acid even in the raising pipe. This oxidation is continued in the tower B, where oxygen and liquid flow in the same direction and where the oxygen is allowed to act upon a liquid mixture which has already been acted upon by oxygen in the tower A. The action of the oxygen upon the liquid thus takes place in steps according to the counter current principle. From the tower B the rest of the oxygen passes through the pipe H to the liquid raiser E, where it is allowed to act upon the fresh mixture of water or nitric acid. This action is continued in the tower A, where the gas and the liquid flow in the same direction. Owing to the fact that the oxygen is never quite pure, the oxygen leaving the tower A will be somewhat diluted, and it is necessary to let out a quantity of gas (corresponding to the content of impurities) from the tower A. This takes place through a dephlegmator O which effects the condensation of the nitric acid vapors, which are carried along with the escaping gas, the condensed acid flowing back into the pipe G. From the mixing tubes m a pipe P leads directly to the top of the tower A and through this pipe a portion of the mixture from m may be led directly into the tower A, without passing through the liquid raiser E. Another pipe R connects the pipe C directly to the top of the tower B, so that it is possible to pass a portion of liquid directly from the pipe C into the tower.

Contrary to the known processes (cfr. for instance German patent specification No. 225706) for the oxidation of nitrogen peroxid to nitric acid under pressure in which normal temperatures or a temperature lowered to about 0° C. by means of cooling are employed, according to the present invention the most favorable results are obtained by higher temperatures (about 70° C. having proved to be suitable). For this reason the process is advantageously carried into effect by means of nitrogen oxids in a gaseous state as obtained for instance in the manufacture of nitrate from nitrite and nitric acid or by boiling nitrosylsulfuric acid (in the first instance nitric oxid NO and in the second instance nitrogen trioxid $N_2O_3$). The conversion of these oxids to liquid nitrogen peroxid is effected as known by a strongly exothermic oxidation reaction and the manufacture of peroxid therefore involves the use of cooling means.

According to the present process the heat produced by the oxidation of the nitrogen oxids is utilized for the process and it has been found, that in this manner so much heat is evolved in the apparatus that indirect heat supply can be avoided, which on its side involves a simplification of the apparatus.

The process is therefore not only of advantage in so far as the disadvantages and expenses connected with the manufacture of liquid nitrogen peroxid are avoided but a considerable saving is also attained as regards the construction and working of the plant. In carrying out the process in the described manner the oxygen is completely utilized. As residual gas is obtained only the small quantities of impurities which is always contained in the oxygen employed, mixed with nitrogen oxids. This residual gas can be utilized by absorption in water or in alkalis or in other ways.

As a matter of course the apparatus could be supplied with nitrogen peroxid in a liquid state.

We claim—

1. Process for the manufacture of concentrated nitric acid which consists in maintaining currents of a nitrogen oxid, oxygen and an aqueous reaction liquid in contact with each other through a series of reaction spaces under a superatmospheric pressure, the current of oxygen being caused to pass in parallel to the aqueous reaction liquid through each of the individual reaction spaces, whereas the oxygen is supplied to the series of reaction spaces considered as a unit in the reversed order of succession to that of the reaction liquid.

2. Process for the manufacture of concentrated nitric acid which consists in maintaining currents of a nitrogen oxid, oxygen and dilute nitric acid in contact with each other through a series of reaction spaces under a superatmospheric pressure, the current of oxygen being caused to pass in parallel to the dilute nitric acid through each of the individual reaction spaces, whereas the oxygen is supplied to the series of reaction spaces considered as a unit in the reversed order of succession to that of the dilute nitric acid.

3. Process for the manufacture of concentrated nitric acid which consists in maintaining currents of a mixture of nitrogen oxids, oxygen and an aqueous reaction liquid in contact with each other through a series of reaction spaces under a superatmospheric pressure, the current of oxygen being caused to pass in parallel to the aqueous reaction liquid through each of the individual reaction spaces, whereas the oxygen is supplied to the series of reaction spaces considered as a unit in the reversed order of succession to that of the reaction liquid.

4. Process for the manufacture of concentrated nitric acid which consists in maintaining currents of a nitrogen oxid, oxygen and an aqueous liquid in contact with each other through a series of reaction spaces under a superatmospheric pressure and at a raised temperature, the current of oxygen being caused to pass in parallel to the aqueous reaction liquid through each of the individual reaction spaces, whereas the oxygen is supplied to the series of reaction spaces considered as a unit in the reversed order of succession to that of the reaction liquid.

In testimony that we claim the foregoing as our invention, we have signed our names in presence of two subscribing witnesses.

EINAR BERGVE.
OLAF JENSEN.

Witnesses:
C. NORMAN,
EINAR N. DIESERUND.